No. 700,616. Patented May 20, 1902.
A. CLASSEN.
PROCESS OF CONVERTING CELLULOSE INTO FERMENTABLE SUGAR.
(Application filed Mar. 22, 1901.)
(No Model.)
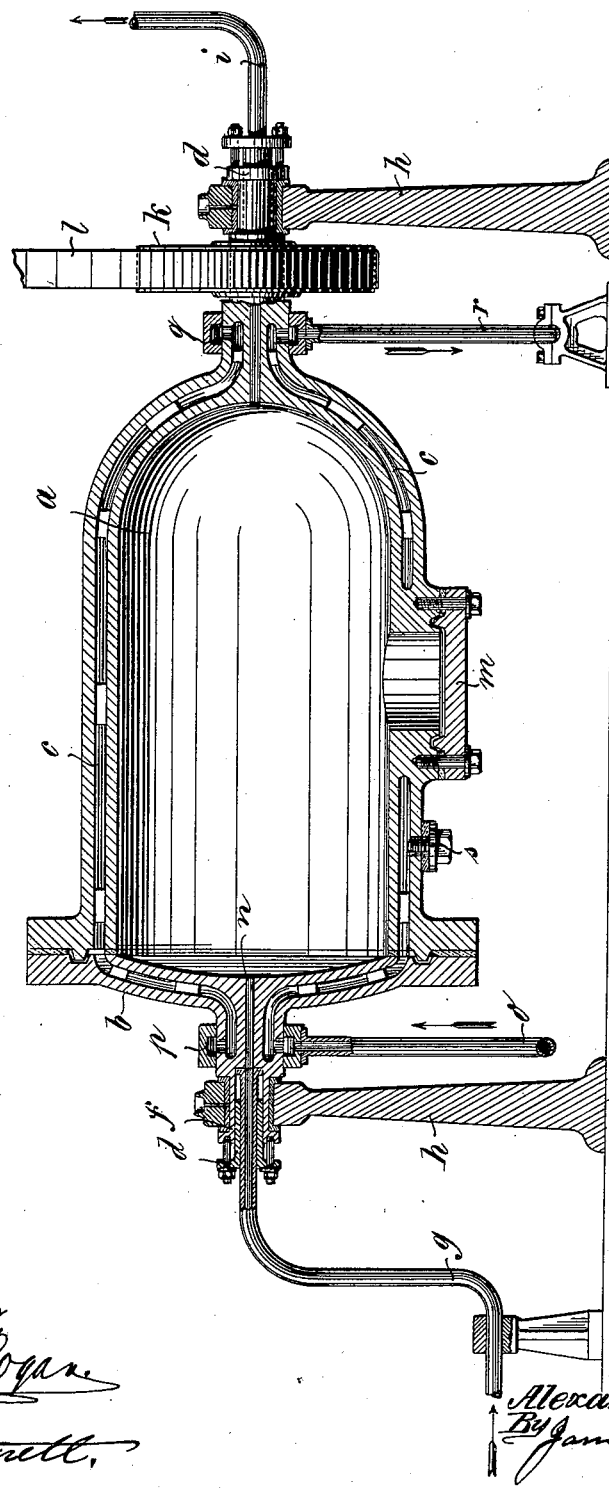
Witnesses
Inventor
Alexander Classen.
By James L. Norris
Atty.

UNITED STATES PATENT OFFICE.

ALEXANDER CLASSEN, OF AACHEN, GERMANY.

PROCESS OF CONVERTING CELLULOSE INTO FERMENTABLE SUGAR.

SPECIFICATION forming part of Letters Patent No. 700,616, dated May 20, 1902.

Application filed March 22, 1901. Serial No. 52,414. (No specimens.)

*To all whom it may concern:*

Be it known that I, ALEXANDER CLASSEN, a citizen of Germany, residing at Aachen, in the Empire of Germany, have invented a certain new and useful Process of Converting Cellulose into Fermentable Sugar, of which the following is a specification.

This invention relates to a certain new and useful process for converting cellulose into fermentable sugar, and aims to improve the method of converting wood into fermentable sugars consisting of treating ligneous matter by mixing with it sulfuric acid of 57° Baumé and effecting the reaction between the cellulose of the wood and the said acid mainly by the application of great pressure. For a yield of about forty per cent. by this process three-quarter parts, by weight, of sulfuric acid to one part, by weight, of sawdust is required.
According to the process hereinafter described a similar result is obtained without the use of pressure and with a smaller quantity of acid. Such result is obtained by the employment of the vapor of sulfuric anhydrid (produced by the well-known process of passing sulfurous oxid and air over suitable contact-surfaces) to act on the moist sawdust or the like.

For carrying out the process an apparatus may be employed as shown in the accompanying drawing, which is shown in sectional elevation.

The apparatus consists of a lead-lined drum $a$, provided with an air-tight cover $b$ and rotatable around its longitudinal axis by means of a pulley $k$ and belt $l$. The drum is provided with a jacket $c$, heated by means of steam, waste steam, waste gases, and the like, entering through the pipe $o$ and the hollow ring $p$ and leaving through the hollow rings $q$ and $r$. The drum is also provided with a tap $s$ for removing the water of condensation. The trunnions $f$ of the drum revolve in bearings or standards $h$. The gases are fed by the fixed pipe $g$, air-tightly connected with the bore $n$ of the cover by means of the stuffing-box $d$. The gases escape through the reference-pipe $i$, similarly arranged. The reference-letter $m$ denotes a manhole to permit of filling and emptying the apparatus. Two or more of these drums may be connected with each other, and the gases may pass from one to the other.

The process is carried out as follows: The vapor of sulfuric anhydrid is passed into the rotary drum, which has been partially filled with the moist material to be converted. A number of the drums may be connected together and the process continued until the desired effect is attained.

The process may be expedited by heating the drums to a temperature of 100° centigrade, or if the material is very moist it is advantageous to heat it after the reaction of the sulfuric-anhydrid vapors has taken place to about 125° centigrade.

After the material has been converted by the sulfuric anhydrid the mass is broken up and boiled with water for a short time in an open vessel.

It will be evident that the combination of the sulfuric anhydrid with the water contained in the sawdust or the like under treatment will result in the formation of sulfuric acid, which at the moment of generation will act upon the material and give off the heat necessary for the reaction or inversion. If the sulfuric anhydrid be so produced or manufactured that it contains a suitable quantity of unchanged sulfurous-oxid gas, sulfurous acid will be formed, together with the sulfuric acid. The former will then also act on the moist sawdust or the like and assist or facilitate the converting of the sawdust or the like by means of the sulfuric acid.

Owing to the cheaper production of the acid and the smaller quantity used, as well as to the simplification of the operation by dispensing with the necessity for mixing the material with the sulfuric acid and afterward disintegrating the mass, the process is suitable for the production of dextrose.

Having thus described my invention, what I claim as new, and desire to secure by Letters Patent, is—

1. The process for converting cellulose into fermentable sugar which consists in subjecting the moist material to the action of sulfuric-anhydrid vapors and then suitably boiling the mass thus obtained with water.

2. The process for converting cellulose into fermentable sugar which consists in suitably heating the moist material, subjecting the material to the action of sulfuric-anhydrid vapors, and then suitably boiling the mass thus obtained with water.

3. The process for manufacturing fermentable sugars which consists in subjecting moist sawdust to the action of sulfuric-anhydrid vapors, and then suitably heating and boiling the mass thus obtained with water.

4. The herein-described process for manufacturing fermentable sugars, which consists in suitably heating moist sawdust, subjecting the material to the action of sulfuric anhydrid and then boiling the mass in an open vessel with water.

In witness whereof I have hereunto set my hand in presence of two witnesses.

ALEXANDER CLASSEN.

Witnesses:
C. E. BRUNDAGE,
HEINR. QUADFLIEG.